US012589460B2

(12) United States Patent
Kruepke et al.

(10) Patent No.: US 12,589,460 B2
(45) Date of Patent: Mar. 31, 2026

(54) PIPE THREADING MECHANISMS AND SYSTEMS

(71) Applicant: Ridge Tool Company, Elyria, OH (US)

(72) Inventors: Scott Kruepke, Valley City, OH (US); Seth B. Bullock, Cleveland, OH (US); Glen R. Chartier, Avon Lake, OH (US); Harald Krondorfer, Aurora, OH (US)

(73) Assignee: Ridge Tool Company, Elyria, OH (US)

( * ) Notice: Subject to any disclaimer, the term of this patent is extended or adjusted under 35 U.S.C. 154(b) by 0 days.

(21) Appl. No.: 18/315,346

(22) Filed: May 10, 2023

(65) Prior Publication Data

US 2023/0278122 A1 Sep. 7, 2023

Related U.S. Application Data

(63) Continuation of application No. 17/126,253, filed on Dec. 18, 2020, now Pat. No. 11,684,986.

(51) Int. Cl.
| | |
|---|---|
| *B23Q 17/24* | (2006.01) |
| *B23G 1/24* | (2006.01) |
| *B23G 1/46* | (2006.01) |
| *B23G 1/52* | (2006.01) |

(52) U.S. Cl.
CPC ........... *B23Q 17/2414* (2013.01); *B23G 1/24* (2013.01); *B23G 1/46* (2013.01); *B23G 1/52* (2013.01); *B23G 2200/08* (2013.01)

(58) Field of Classification Search
CPC ........ B23Q 17/2414; B23G 1/24; B23G 1/46; B23G 1/52; B23G 2200/08; B23B 31/003; Y10T 279/3481; Y10T 408/859; Y10T 408/90473
See application file for complete search history.

(56) References Cited

U.S. PATENT DOCUMENTS

| | | | |
|---|---|---|---|
| 1,005,147 A | 10/1911 | Borden et al. | |
| 1,018,393 A | 2/1912 | Landis | |
| 1,085,762 A | 2/1914 | Smith | |

(Continued)

FOREIGN PATENT DOCUMENTS

| | | | |
|---|---|---|---|
| CN | 101704141 A | | 5/2010 |
| CN | 102756152 A | * | 10/2012 |

(Continued)

OTHER PUBLICATIONS

Milwaukee Service Parts List; M18 Fuel Pipe Threader; Bulletin No. 54-27-2810; Jun. 2019, 4 pages.

(Continued)

*Primary Examiner* — Eric A. Gates
(74) *Attorney, Agent, or Firm* — RANKIN, HILL & CLARK LLP; Erik J. Overberger

(57) ABSTRACT

Power drive tools are described. The tools include one or more threading pawls, one or more release pawls, and a drive ring selectively positionable relative to the tool and engaged with the pawls to selectively extend or retract the pawls. Also described are tools that include one or more lights to illuminate a workpiece. Also described are tools having distally located shoulder regions at which force may readily be applied. In addition, gear train assemblies for use in the power drive tools are described.

16 Claims, 16 Drawing Sheets

(56)                  References Cited

U.S. PATENT DOCUMENTS

| | | | |
|---|---|---|---|
| 1,170,066 | A | 2/1916 | Holzscheiter |
| 1,209,140 | A | 12/1916 | Gates |
| 1,269,468 | A | 6/1918 | Leonard |
| 1,284,709 | A | 11/1918 | Koehler |
| 1,289,721 | A | 12/1918 | Fisher |
| 1,464,177 | A | 8/1923 | William |
| 2,749,807 | A * | 6/1956 | Burgsmuller ............ B23G 1/32 |
| | | | 409/65 |
| 2,855,679 | A * | 10/1958 | Gibble ................ B25H 1/0092 |
| | | | 33/286 |
| 3,504,716 | A * | 4/1970 | Morganson .......... B23D 59/002 |
| | | | 30/392 |
| 4,700,441 | A * | 10/1987 | Ikeda .................... B23G 3/005 |
| | | | 470/99 |
| 5,531,549 | A | 7/1996 | Fossella |
| 6,293,172 | B1 * | 9/2001 | Smith .................... B25B 23/18 |
| | | | 81/177.2 |
| 6,328,505 | B1 * | 12/2001 | Gibble ................ B25H 1/0092 |
| | | | 408/710 |
| 6,886,961 | B2 * | 5/2005 | Hara ........................ B25F 5/021 |
| | | | 362/120 |
| 6,890,135 | B2 * | 5/2005 | Kopras .................. B25F 5/008 |
| | | | 362/120 |
| 6,898,860 | B2 | 5/2005 | Wu |
| 6,921,235 | B2 * | 7/2005 | Chen ...................... B23Q 17/24 |
| | | | 362/253 |
| 7,217,071 | B2 | 5/2007 | Bayha et al. |
| 7,404,696 | B2 * | 7/2008 | Campbell ............ B25H 1/0078 |
| | | | 408/202 |
| 8,328,381 | B2 | 12/2012 | Dixon et al. |
| 9,095,917 | B2 | 8/2015 | Patil et al. |

| | | | |
|---|---|---|---|
| 9,242,355 | B2 * | 1/2016 | Sergyeyenko ............ B25F 5/00 |
| 9,328,915 | B2 * | 5/2016 | Vanko ...................... B25F 5/021 |
| 11,077,509 | B2 | 8/2021 | VanDaalwyk et al. |
| 2007/0036624 | A1 | 2/2007 | Bayha et al. |
| 2010/0214768 | A1 | 8/2010 | Dixon et al. |
| 2014/0037394 | A1 | 2/2014 | Patil et al. |
| 2019/0283157 | A1 | 9/2019 | VanDaalwyk et al. |
| 2022/0009064 | A1 | 1/2022 | Puzio |
| 2022/0168832 | A1 | 6/2022 | Wolf |

FOREIGN PATENT DOCUMENTS

| | | | | |
|---|---|---|---|---|
| CN | 104870133 | A | 8/2015 | |
| CN | 107635725 | A | 1/2018 | |
| CN | 108687368 | A | 10/2018 | |
| DE | 102016211853 | A1 * | 1/2018 | |
| EP | 1464428 | A1 * | 10/2004 | ............ B23B 49/00 |
| GB | 381281 | A | 10/1932 | |
| GB | 2165478 | A * | 4/1986 | .......... B21D 28/246 |

OTHER PUBLICATIONS

Ridgid Power Drives Manual; 999-999-476.10_Rev. F; Jun. 2020; 52 pages.
Flexvolt® 60V Max* Cordless Pipe Threader Kit With Die Heads—DCE700X2K | Dewalt; Dec. 15, 2020; https://www.dewalt.com/products/accessories/tool-accessories/pipe-and-tubing-tool-accessories/flexvolt-60v-max-cordless-pipe-threader-kit-with-die-h%E2%80%A6; 5 pages.
Chinese Office Action and Search Report dated May 8, 2024; Application No. CN202111552440.4; 8 pg.

* cited by examiner

PIPE THREADING MECHANISMS AND SYSTEMS

CROSS REFERENCES TO RELATED APPLICATIONS

This application is a continuation application and claims priority from U.S. nonprovisional application Ser. No. 17/126,253 filed on Dec. 18, 2020.

FIELD

The present subject matter pertains to hand-held power drives and mechanisms for pipe threader use. The present subject matter is also applicable to threading operations performed using threading machines or similar devices.

BACKGROUND

Current and typical use of a conventional power drive tool is as follows. The tool transmits torque, for example, to a die head or similar device in order to rotate the device relative to a pipe or other member or a longitudinal axis. However, while the die head is positively engaged rotationally, it is not significantly held axially, along a longitudinal axis, retainably by or within the tool. Therefore, there are instances in which the die head may separate undesirably from the tool axially during use, causing a nuisance to the user.

Moreover, a user must often apply axial force to the die head to allow thread cutting dies to start removing material from a region adjacent a pipe or workpiece. If insufficient force is applied, the dies will simply chamfer the end of the pipe, and never "bite" into the surface of the pipe to create a helical thread. Because of this, some users will push on the tool to create an axial "starting" force to initiate such a "bite." In current practice, most users apply such an axial force directly onto the rotating die head.

Although satisfactory in many respects, a need exists for a pipe threading assembly and associated system that addresses these operational concerns.

SUMMARY

The difficulties and drawbacks associated with previous approaches to control pipe-threading operations are addressed in the present subject matter as follows.

In one aspect, the present subject matter provides a power drive tool comprising a tool body enclosing a motor, a tool head portion extending from the tool body, and at least one light directed to emit light toward the tool head portion, wherein the at least one light is directed to emit light inwardly from the tool body.

In another aspect, the present subject matter provides a power drive tool comprising a tool body enclosing a motor. The power drive tool also comprises a tool head portion extending from the tool body. The tool head portion defines an axially accessible tool opening. The tool head portion includes a cylindrical wall concentrically and rotatably supported in the tool opening. The power drive tool also comprises at least one light directed to emit light toward the tool opening defined in the tool head portion.

In still another aspect, the present subject matter provides a power drive tool comprising a tool body and a motor disposed within the tool body. The power drive tool also comprises a tool head portion extending from the tool body. The tool head portion defines an axially accessible tool opening that accepts a die head. The power drive tool also comprises a plurality of lights supported on the tool body and directed radially inward toward the die head.

As will be realized, the subject matter described herein is capable of other and different embodiments and its several details are capable of modifications in various respects, all without departing from the claimed subject matter. Accordingly, the drawings and description are to be regarded as illustrative and not restrictive.

DETAILED DESCRIPTION OF THE EMBODIMENTS

The present subject matter prevents inadvertent separation of a die head from a power drive tool. The present subject matter provides assemblies for actively engaging and/or disengaging a die head with a power drive tool.

The present subject matter also provides one or more lights on a power drive tool for illuminating a workpiece for easier use. In current threading practice, a user must visually identify when the thread is completed, so visibility to this area is critical. Further, in many applications, hand-held power drives are used for service work or to thread pipe that is already installed. In these cases, and in the case of typical new construction areas, installed workplace lighting is limited. Therefore, providing a light on the tool provides more consistent illumination of the workpiece. Due to the rotation of the die head during use, there are unique challenges in illuminating the pipe compared to other power tool uses.

In addition, the present subject matter allows a user to start a thread or begin thread creation via pushing on the tool rather than the die head. The present subject matter also provides a defined or dedicated area on a power drive tool for the user to push upon to start a thread cutting operation. This eliminates the need for an additional protrusion or member attached or assembled to the tool to push for thread cutting or engagement.

The present subject matter also provides a tool assembly that results in a shorter overall length, higher overall mechanical efficiency, and utilizes more readily-available gear technology to transmit a desired torque from the tool motor to the output gear of the tool.

Although various references to pipe threading and threading of pipes are noted herein, it will be understood that the present subject matter is not limited to forming or machining threads in pipes. Instead, the present subject matter may be applicable to forming or machining threads in a wide array of workpieces besides pipes. Furthermore, although the present subject matter is described in reference to die heads used for threading operations, it will be understood that the present subject matter may be used in association with other tools and components.

In one embodiment, the present subject matter provides an assembly to actively engage or disengage threading pawls of a power drive tool from contact with a die head, and particularly a RIDGID 12-R style die head available from Ridge Tool Company. It will be understood that although various products available from Ridge Tool Company are referenced herein, the present subject matter is not limited to those products and instead is applicable to a wide array of other products and goods, including those available from other suppliers and manufacturers.

Figures 1A, 1B:
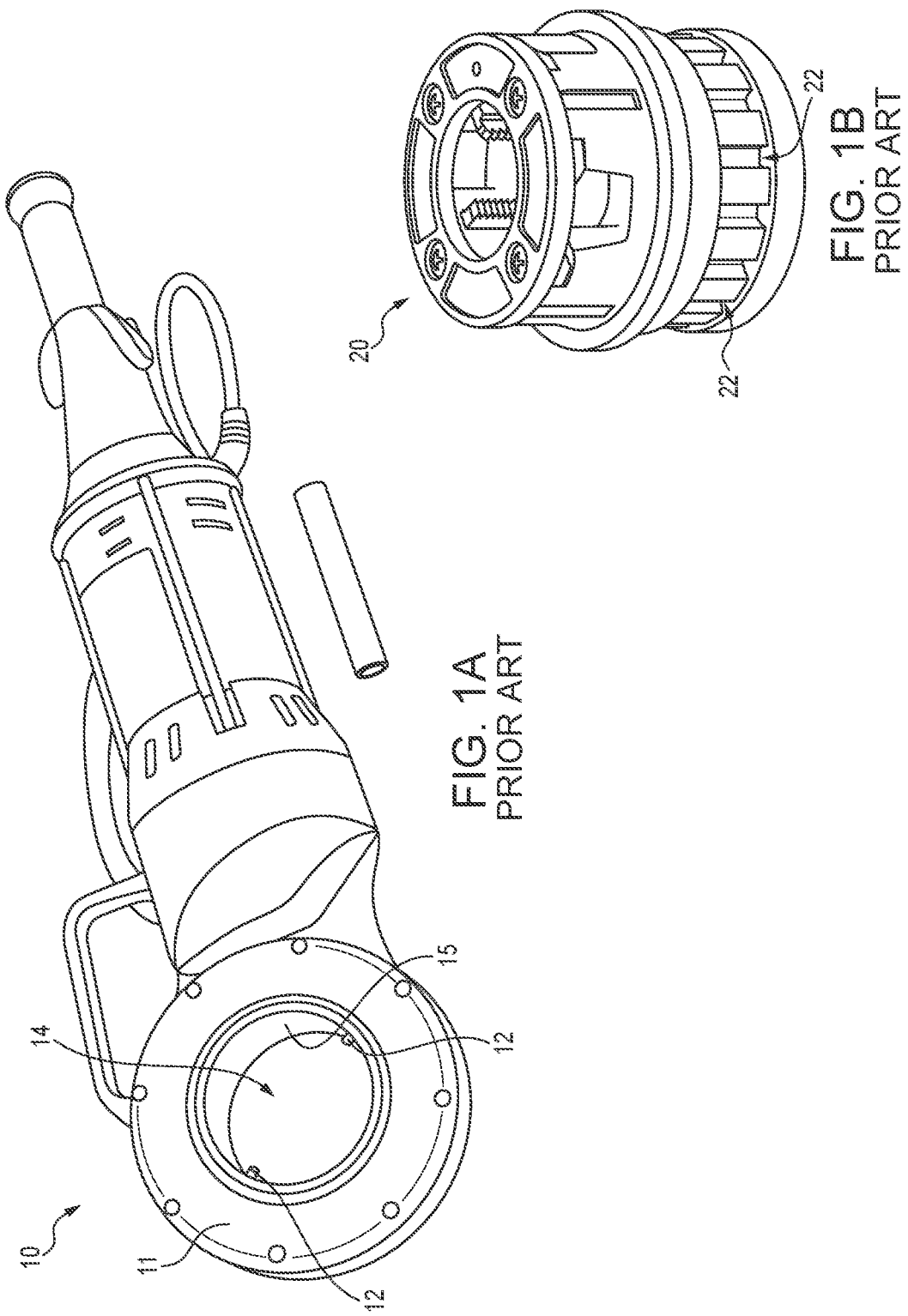
FIG. 1A illustrates a conventional power drive tool.
FIG. 1B illustrates a conventional die head.

In the market today, power drive tools have at least one, and most have two, threading pawls that extend radially inward from a head portion of the tool. Referring to FIG. 1A, these threading pawls are shown as threading pawls 12 in a representative RIDGID 700 power drive tool 10 available from Ridge Tool. The threading pawls 12 extend radially inward from a head portion 11 of the power drive tool 10. Specifically, the threading pawls 12 extend radially from a rotatably supported cylindrical wall 15. Upon powering and actuation of the tool 10, the assembly of wall 15 and threading pawls 12 rotate. The threading pawls 12 are spring-biased and engage slots 22 in a removable and separable die head 20, shown in FIG. 1B.

Because the pawls 12 are spring-biased radially, the die head 20 can be inserted into a tool opening or receiving region 14 of the tool 10. Such insertion pushes the threading pawls 12 radially outward to allow the die head 20 to be fully installed with the tool 10. When installed, the threading pawls 12 engage the threading pawl slots 22 of the die head 20 and thereby securely retain the die head 20 with the tool 10.

Figure 2A:
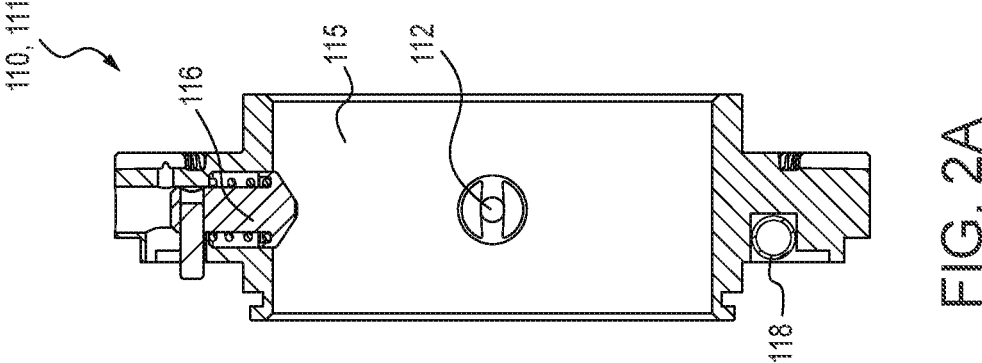
FIG. 2A is a cross section of the head portion shown in FIG. 2, taken along line 2A-2A.
Figure 2:
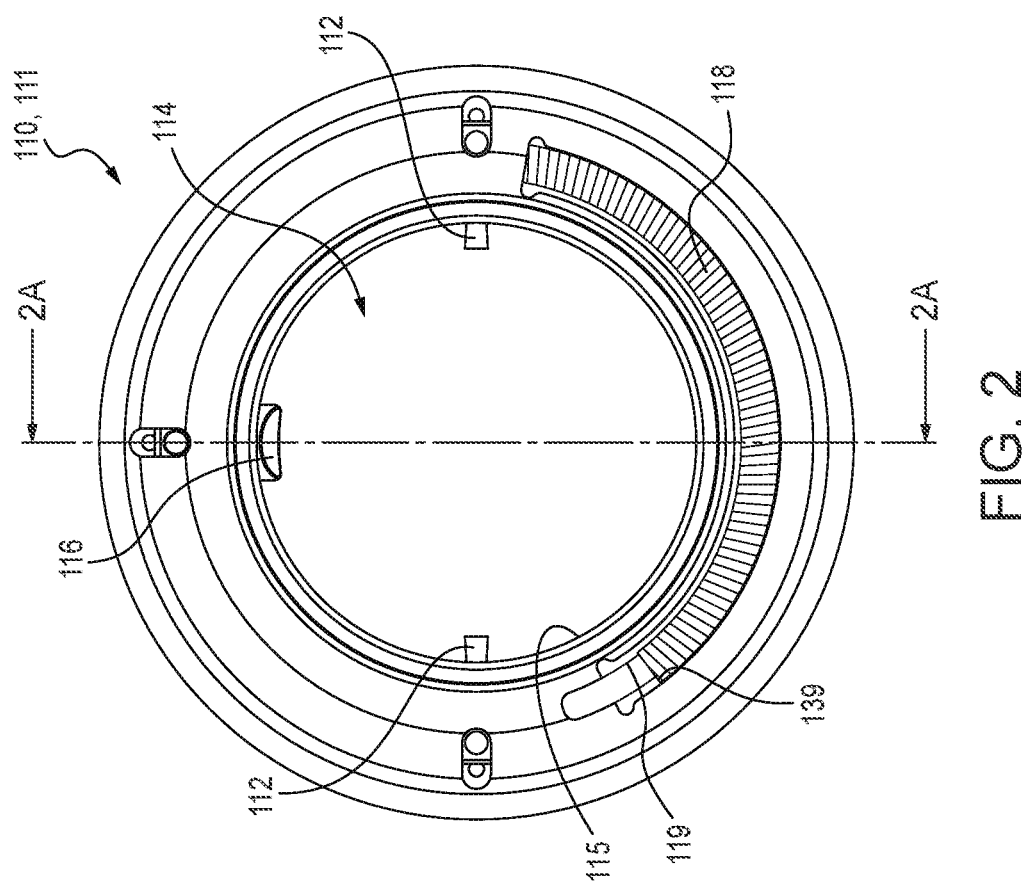
FIG. 2 illustrates an embodiment of a head portion of a power drive tool in accordance with the present subject matter.

In accordance with the present subject matter, a power drive tool and particularly a tool head portion of a power drive tool comprises one or more threading pawls that extend radially inward from the tool opening. In addition, the power drive tool and particularly a tool head portion further comprises one or more release pawls that also extend radially inward from the tool opening. In many versions, the power drive tool and particularly a tool head portion further comprises a bias spring that is seated within a capture region as well. These aspects are illustrated in FIGS. 2 and 2A. Specifically, FIGS. 2 and 2A illustrate an embodiment of a head portion 111 of a power drive tool 110. The head portion 111 defines a tool opening or receiving region 114 configured, i.e., sized and shaped, to receive a die head as described herein. The power drive 110 comprises one or more threading pawls 112 that can be extended radially inward from the head portion 111 and from a rotatably supported cylindrical wall 115. The power drive 110 also comprises one or more release pawls 116 that can be extended radially inward from the head portion 111. The pawls 112 and 116 can also be retracted or withdrawn radially outward into the head portion as described herein. In certain versions, the power drive 110 also comprises a bias spring 118 disposed within a capture region 119 defined in the head portion 111. These aspects are described in greater detail herein.

Figure 3A:
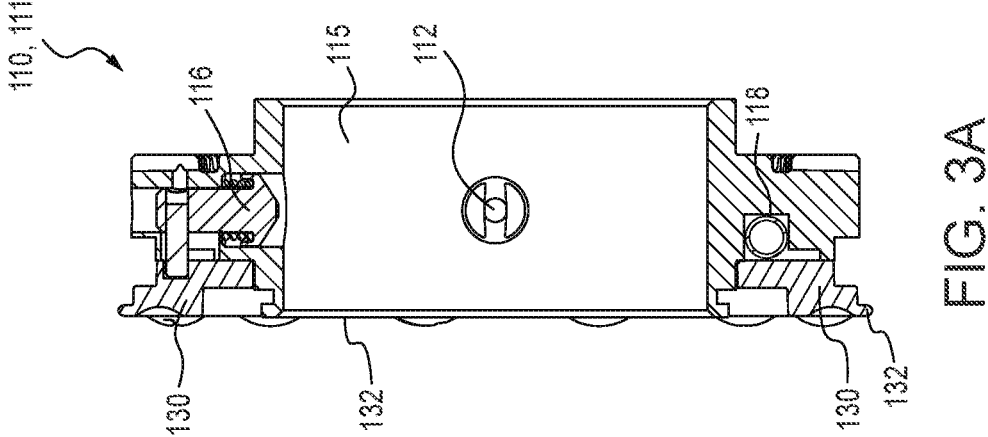
FIG. 3A is a cross section of the drive ring and head portion shown in FIG. 3, taken along line 3A-3A.
Figure 3:
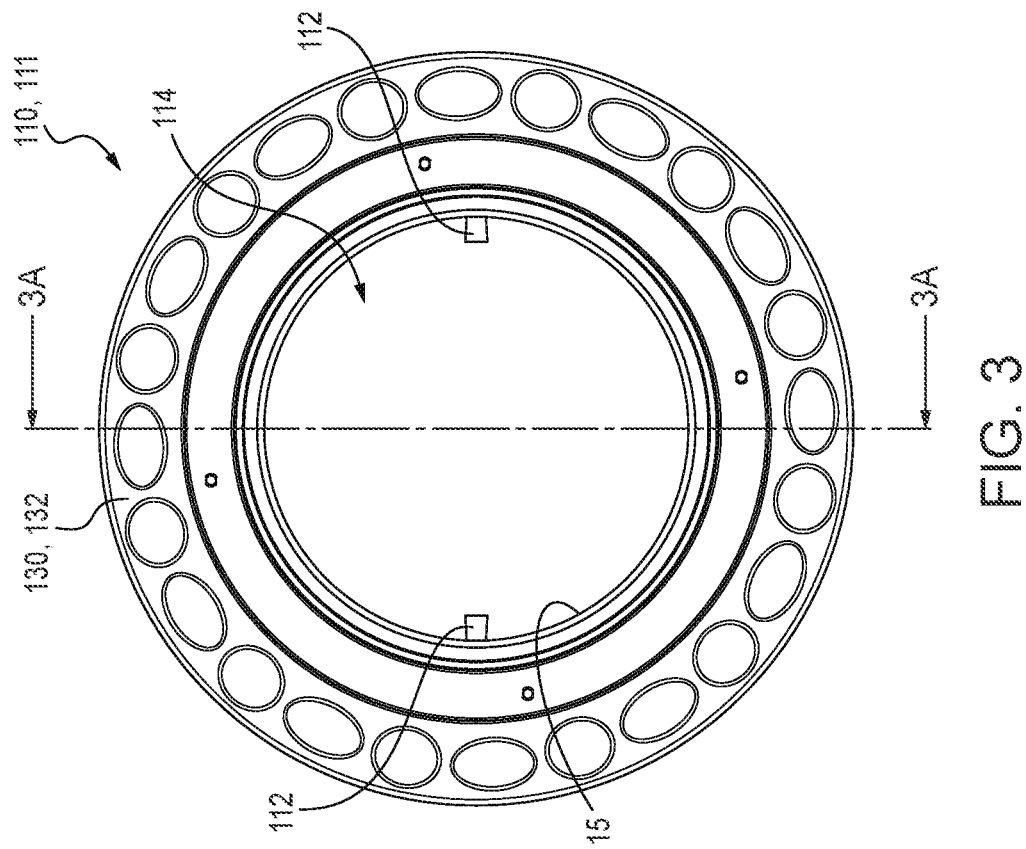
FIG. 3 illustrates an outer face of an embodiment of a drive ring and the head portion depicted in FIG. 2.

In many versions, a drive ring is used in conjunction with the tool head portion as can be seen in FIGS. 3 and 3A. Specifically, FIGS. 3 and 3A illustrate an outer face 132 of an embodiment of a drive ring 130. The drive ring 130 is shown as installed and positioned on the tool head portion 111 of the power drive tool 110 depicted in FIG. 2. More specifically, the drive ring 130 is rotatably mounted on the tool head portion 111. The drive ring 130 is rotatably positionable between a first position and a second position. The drive ring 130 is engaged with the threading pawls 112 and the release pawl 116 (shown in FIG. 2) such that upon positioning the drive ring to the first position, the threading pawls 112 extend into the tool opening 114 and the release pawl 116 is retracted from extending into the tool opening 114. Upon positioning the drive ring 130 to the second position, the threading pawls 112 are retracted from extending into the tool opening 114 and the release pawl 112 extends into the tool opening 114. These positions and arrangement of components are described in greater detail herein.

Figure 4A:
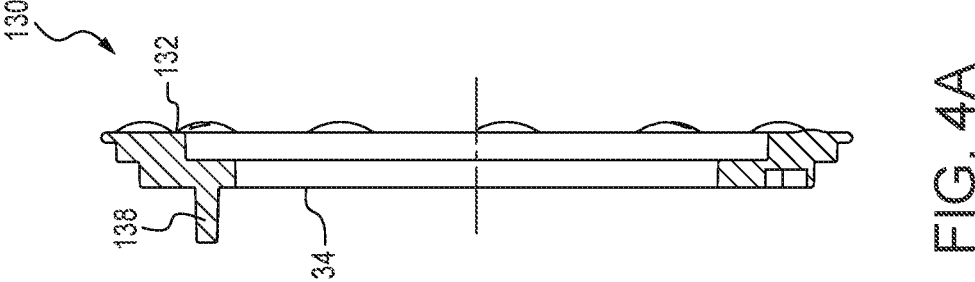
FIG. 4A is a cross section of the drive ring shown in FIG. 4, taken along line 4A-4A.
Figure 4:
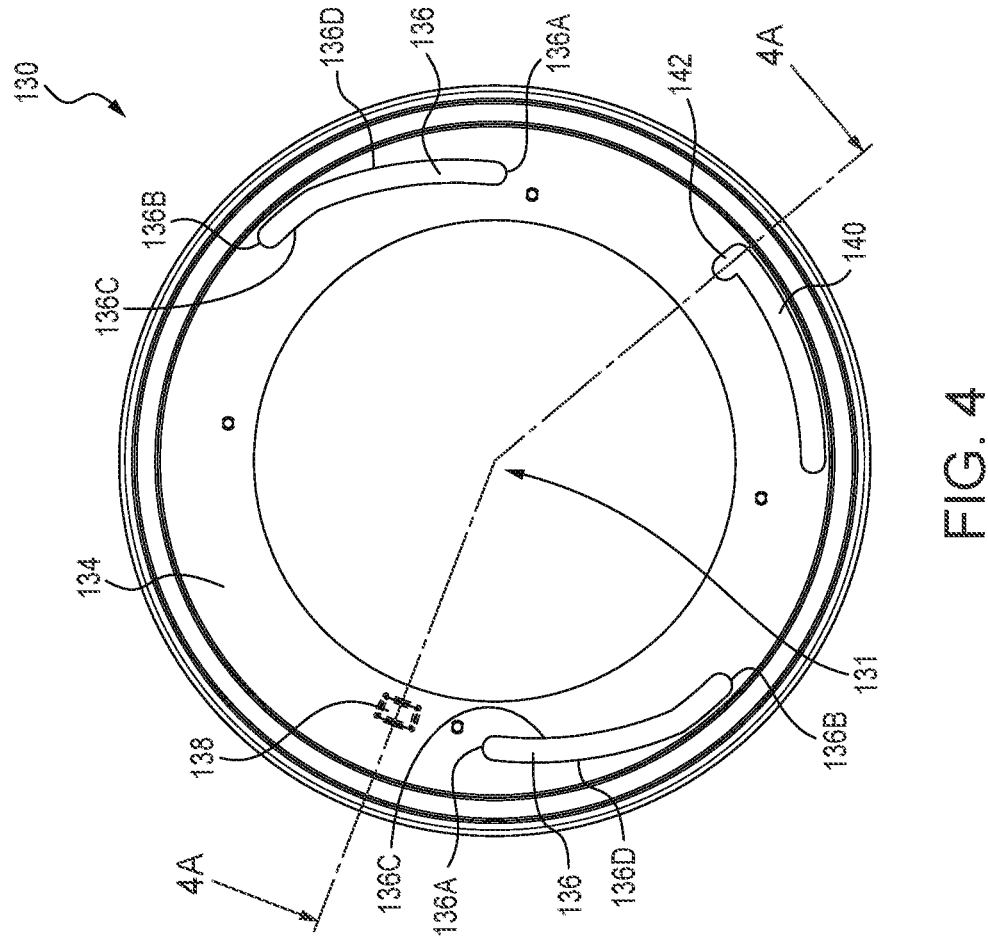
FIG. 4 illustrates an inner face of the embodiment of the drive ring shown in FIG. 3.

FIGS. 4 and 4A illustrate an inner face 134 of the drive ring 130, which upon assembly with the tool head portion 111, is directed toward the bias spring 118, the threading pawls 112, and the release pawl 116. As will be understood, the outer face 132 (shown in FIG. 3) and the inner face 134 of the drive ring 130 are oppositely directed from each other. As further illustrated in FIGS. 4 and 4A, the drive ring 130 includes features that engage the bias spring 118, the threading pawls 112, and the release pawl 116. Specifically, along the inner face 134, the drive ring 130 includes threading pawl slots 136, a bias spring tab 138, and a release pawl slot 140. The release pawl slot 140 includes a release pawl extension and detent section 142. Upon assembly of the drive ring 130 with the tool head portion 111, the bias spring tab 138 engages a spring catch 139 shown in FIG. 2, that is affixed or otherwise engaged with the bias spring 118. And upon the noted assembly, portions or members of the pawls 112 and 116 are engaged with, and in certain versions slidingly received in, the slots 136 and 140, respectively. These aspects are described in greater detail herein.

When a user rotates the drive ring 130, the threading pawl slots 136 actively move the threading pawls 112 of the tool 110 radially outward (or inward) via a cam profile of the slots 136. The cam profile of the slots 136 is described in greater detail herein. In this manner, the tool opening 114 is cleared of any threading pawl presence when the drive ring 130 is rotated completely. Further, as the drive ring 130 is rotated, the bias spring 118 is compressed. Finally, the release pawl 116 is allowed to extend into the tool opening 114 when the drive ring 130 is rotated completely. Due to the shape of the release pawl extension and detent section 142 of the release pawl slot 140, the release pawl 116 then prevents the drive ring 130 from returning to its original position despite the active bias spring force in contact with the bias spring tab 138 of the drive ring 130.

Referring further to FIG. 4, the term "cam profile" of the threading pawl slots 136 refers to a configuration or orientation of the slots relative to a center 131 of the drive ring 130. Specifically, each slot 136 defines an inner end 136A, an outer end 136B, and slot walls 136C and 136D extending between the ends 136A and 136B. The inner end 136A is closer to the center 131 than the outer end 136B. The term "cam profile" refers to the geometric and typically arcuate profile of the slot walls 136C and 136D. It will be understood that upon assembly of the drive ring 130 with the tool head portion 111, the radial positions of the threading pawls 112 are governed by the cam profile of the slots 136. Although the present subject matter encompasses a wide array of assemblies and component configurations, in the described embodiment, each threading pawl 112 includes a projection or member 112A described in greater detail herein that is movably engaged with, slidably disposed in, or otherwise in contact or directed by the threading pawl slots 136. Similarly, the release pawl 116 includes a projection or member 116A also described in greater detail herein that is engaged with, slidably disposed in, or otherwise in contact or directed by the release pawl slot 140. The bias spring 118 urges the drive ring 130 to the previously noted first position shown in FIGS. 5A and 5B.

Figure 5A:
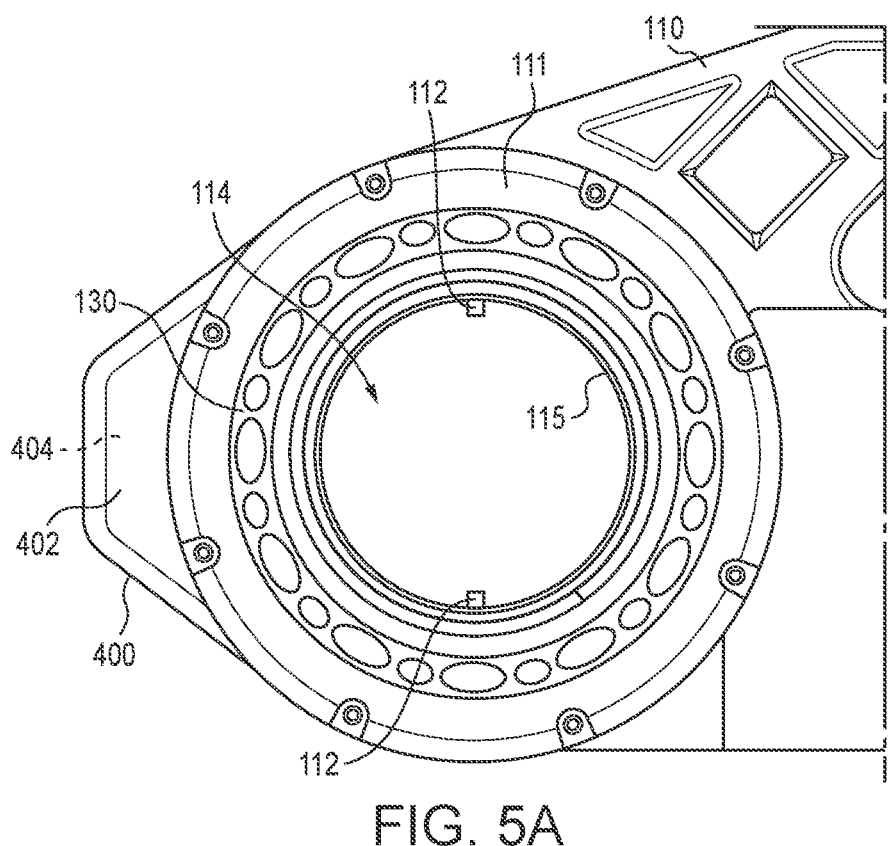
FIG. 5A illustrates the drive ring of FIG. 3 installed on a head portion of a power drive tool.
Figure 5B:
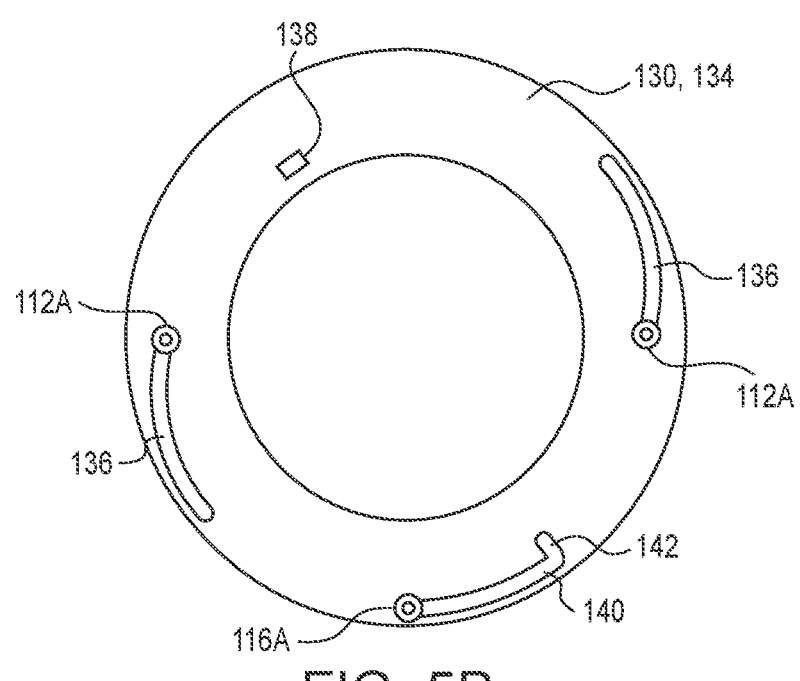
FIG. 5B illustrates the inner face of the drive ring of FIG. 5A with various members slidingly disposed in slots of the drive ring.

Referring to FIG. 5A, in a normal operating position of the tool 110, i.e., the noted first position of the drive ring 130, the tool opening 114 appears as shown. Here, the threading pawls 112 only extend into the tool opening 114. And thus the release pawl 116 does not extend into the tool opening 114. Also shown in FIG. 5B is the position of the threading pawls 112 and release pawl 116 within their respective slots of the drive ring 130 at the noted first position of the drive ring. Specifically, FIG. 5A illustrates the drive ring 130 installed on the head portion 111 of the power drive tool 110. And FIG. 5B illustrates the inner face 134 of the drive ring 130 in this installed state. In this normal operating position of the tool 110, the threading pawls 112 extend radially into the tool opening or receiving region 114. In this operating position, the release pawl 116 (not shown in FIG. 5A) is retracted and does not extend into the tool opening or receiving region 114. FIG. 5B illustrates the inner face 134 of the drive ring 130 and locations of the threading pawl members 112A and release pawl member 116A within their respective slots 136, 140, respectively. As previously noted, each threading pawl 112 includes a member 112A that is slidingly received within slots 136. And, the release pawl 116 includes a member 116A that is slidingly received within the release pawl slot 140.

Figure 6A:
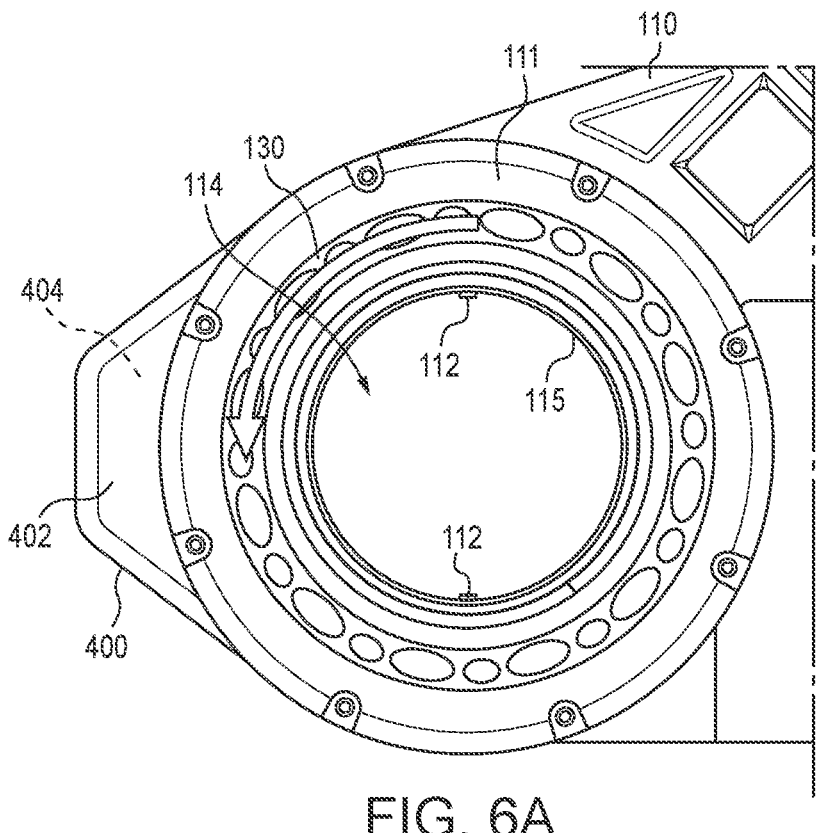
FIG. 6A illustrates the drive ring and head portion of a power drive tool of FIG. 3 and partial rotation of the drive ring.
Figure 6B:
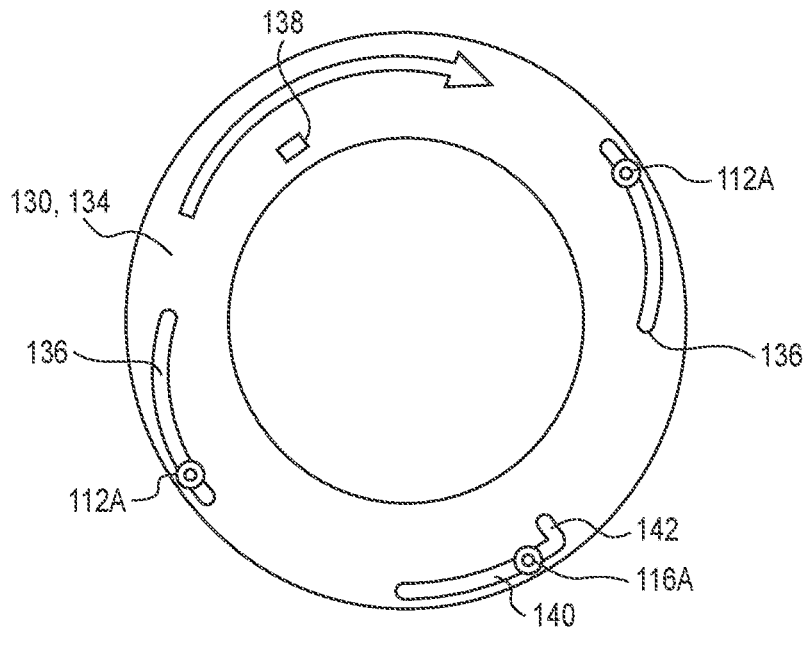
FIG. 6B illustrates the inner face of the drive ring of FIG. 6A with various members slidingly disposed in slots of the drive ring.

Referring to FIG. 6A, counterclockwise rotation of the drive ring 130 (when looking at the tool 110) pulls the threading pawls 112 radially outward, out of the tool opening 114, via the threading pawl slots 136. The release pawl 116 remains retracted relative to the tool opening 114. FIG. 6B illustrates the inner face 134 of the drive ring 130 in its installed state. Further, rotation of the drive ring as shown in FIGS. 6A and 6B, continues to move the threading pawls 112 radially outward outside of the tool opening 114 due to the shape, i.e., the cam profile, of the threading pawl slots 136 of the drive ring 130.

Figure 7A:
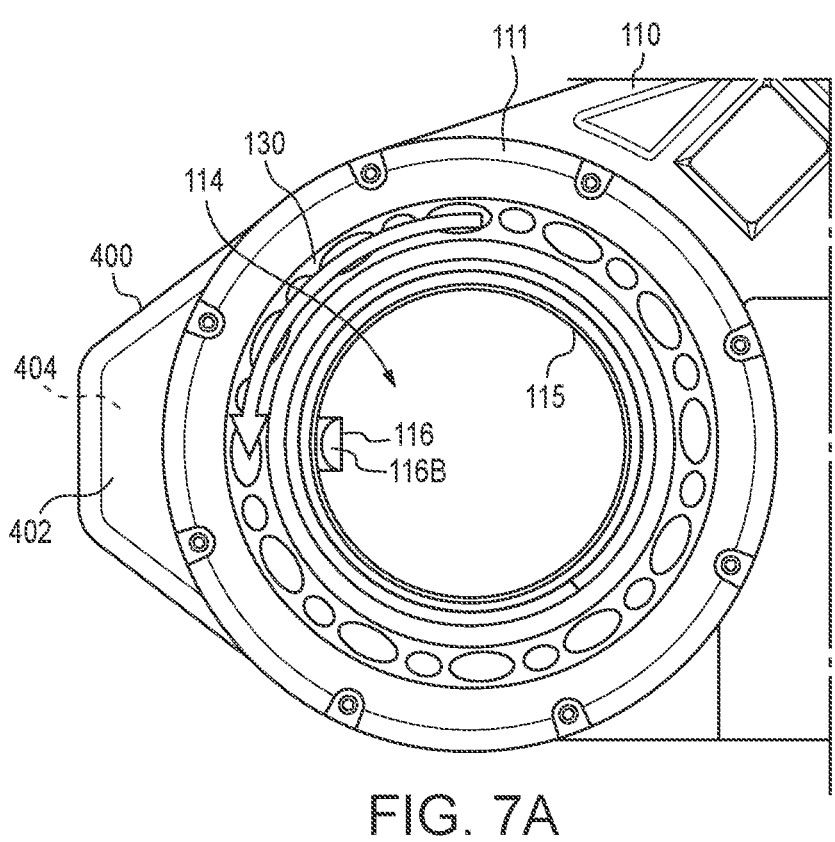
FIG. 7A illustrates the drive ring and head portion of a power drive tool of FIG. 3 and completed rotation of the drive ring.
Figure 7B:
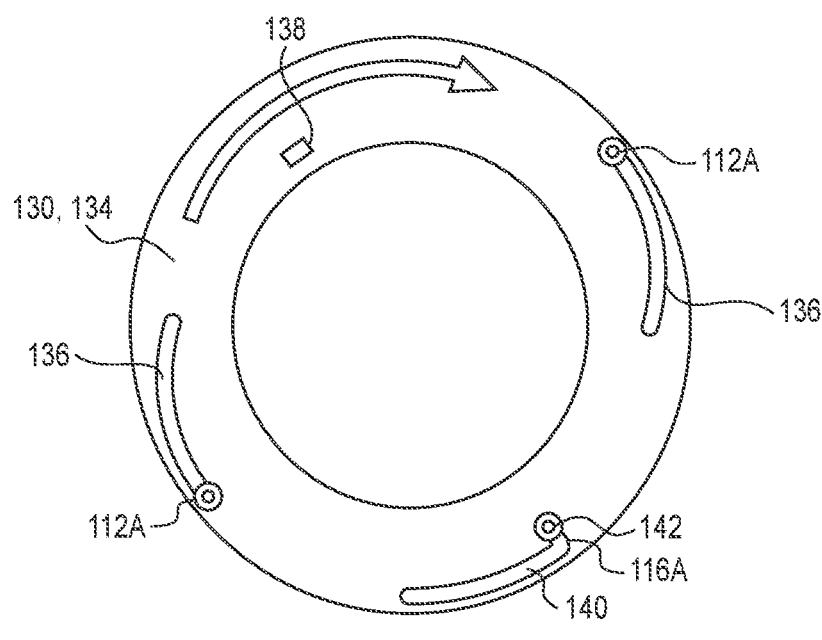
FIG. 7B illustrates the inner face of the drive ring of FIG. 7A with various members slidingly disposed in slots of the drive ring.

Referring to FIGS. 7A and 7B, when the drive ring 130 is completely rotated against the rotational biasing caused by the bias spring 118 and its engagement with the tab 138 of the drive ring 130, another bias spring described herein, urges the release pawl 116 to extend radially inward into the tool opening 114 via the release pawl extension and detent section 142 of the release pawl slot 140 of the drive ring 130. In this condition, i.e., the noted second position of the drive ring, the tool 110 is ready to accept a die head such as die head 20 shown in FIG. 1B. As the user inserts the die head 20, for example a RIDGID model 12-R die head available from Ridge Tool, into the tool opening 114, the die head 20 contacts the release pawl 116. Continued axial insertion of the die head 20 into the tool opening 114 by the user causes the release pawl 116 to be forced radially outward. Doing so allows the release pawl member 116A to exit the release pawl extension and detent section 142 of the release pawl slot 140 of the drive ring 130. When this occurs, there is nothing impeding the bias spring 118 (shown in FIG. 2) from returning the entire drive ring 130 to the normal operating position, i.e., the noted first position. In doing so, the threading pawls 112 are extended radially inward, into contact with the inserted die head 20. The mechanism cycle is complete, and the tool 110 can be used to transmit rotational torque to the die head 20 to complete the desired work.

In many embodiments, a distal end of the release pawl is angled to allow or promote sliding along the axis of the release pawl when contact with the die head is made. It is to be understood that the distal end or distal surface of the release pawl could be shaped differently without consequence. It is significant that the release pawl is translated linearly along its axis upon die head installation. Specifically, FIG. 7A illustrates an angled distal end 1166 of the release pawl 116.

In the embodiments described herein, all pawls, i.e., the threading pawls 112 and the release pawl 116, optionally utilize light conical springs biasing them radially inward. These springs compensate for minor variations in the configuration or drive ring position during use. It is to be understood that other spring types, sizes, or forces could be used. In some embodiments, no springs are actively in contact with the pawls.

While the direction of rotation related to opening, or unlocking, the die head area of the tool is counterclockwise in the embodiment described herein, it is to be understood that alternate embodiments may exist where a different rotational direction is utilized. This is of no consequence to the present subject matter.

While die head retention is known in the market, for RIDGID model 11-R style die heads available from Ridge Tool, there are no known one-handed 11-R installation systems. Restated, no existing systems for 11-R die heads detent in the "open" or "unlock" position. A similar configuration described herein for model 12-R style die heads can be employed for 11-R die heads as well.

Figure 8:
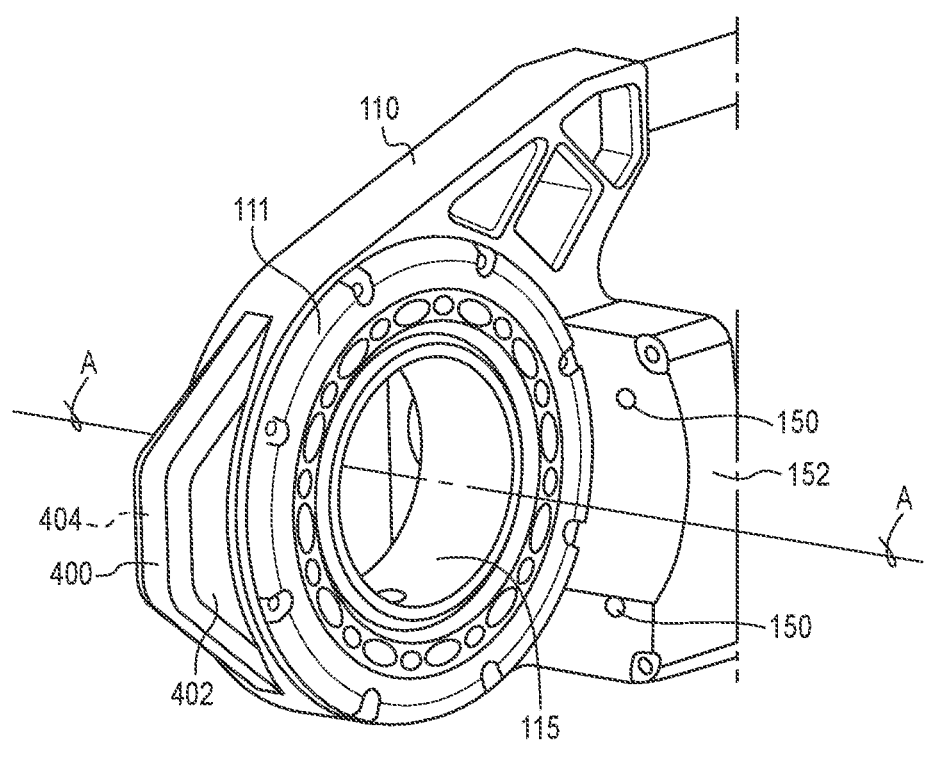
FIG. 8 illustrates a portion of an embodiment of a power drive tool with at least one light in accordance with the present subject matter.

In another embodiment, at least one light on the tool is provided for illuminating the die head and pipe or other workpiece during use for improved visibility. In one embodiment, the tool features one or more lights, for example, LEDs, mounted on the tool body and directed towards the tool opening. These aspects are illustrated in FIG. 8. Specifically, a power drive tool 110 is illustrated. The power drive tool 110 comprises a head portion 111. The power drive tool 110 also comprises one or more lights 150. The lights 150 are mounted or otherwise provided on the tool body denoted as 152. The lights 150 are generally directed toward an axis of rotation of the head portion 111 shown in FIG. 8 as axis A. By placing the lights in this area, the lights are protected and illuminate a pipe or other workpiece radially for optimal visibility.

Figure 9:
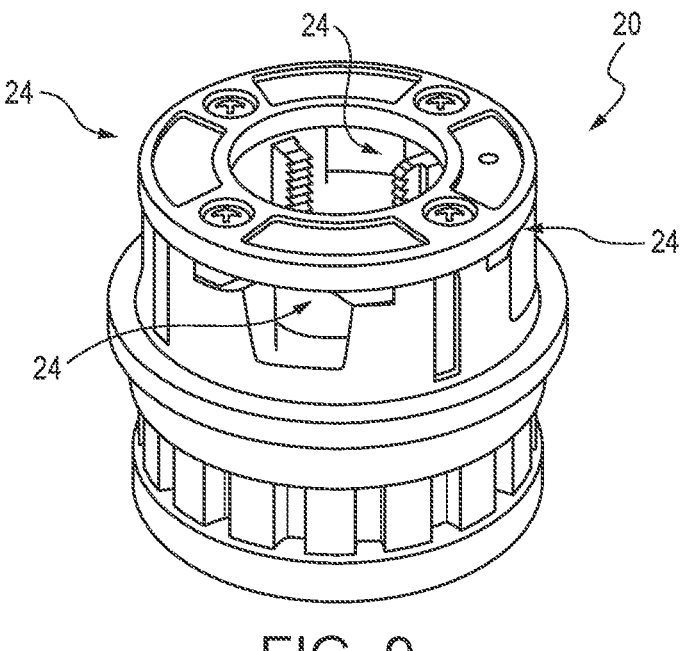
FIG. 9 illustrates the die head of FIG. 1B having a plurality of openings.

Referring to FIG. 9, most commercially available die heads in the market feature a significant amount of structural material with a plurality of, and in most cases, four (4), openings. Specifically, FIG. 9 illustrates the previously described die head 20 shown in FIG. 1B. FIG. 9 shows a plurality of openings 24 arranged equi-distant about the periphery of the die head 20.

Because there are limited openings in most commercially available die heads for the radially directed light to pass through during use, having more than one light, as shown in FIG. 8, may be beneficial. Although it is to be understood that in many applications, one light is sufficient. However, having one light, potentially, creates a strobe effect as the openings rotate around the pipe and the light is intermittently blocked and allowed to pass. More than one light has the benefit of balancing the light that is blocked or allowed to pass. Restated, the lights can be positioned to ensure that the light from at least one of the lights passes through the die head opening to the workpiece at all times or substantially so, regardless of die head rotational position. Here, then, the strobe effect can be minimized or eliminated.

Figure 10B:
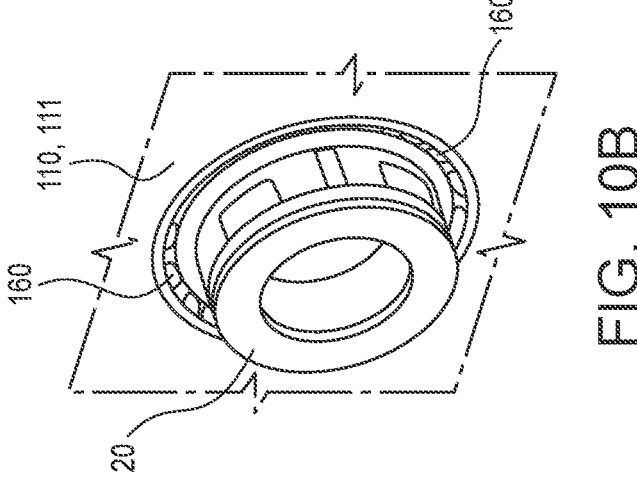
FIGS. 10A and 10B illustrate a portion of another embodiment of a power drive tool with at least one light in accordance with the present subject matter.
Figure 10A:
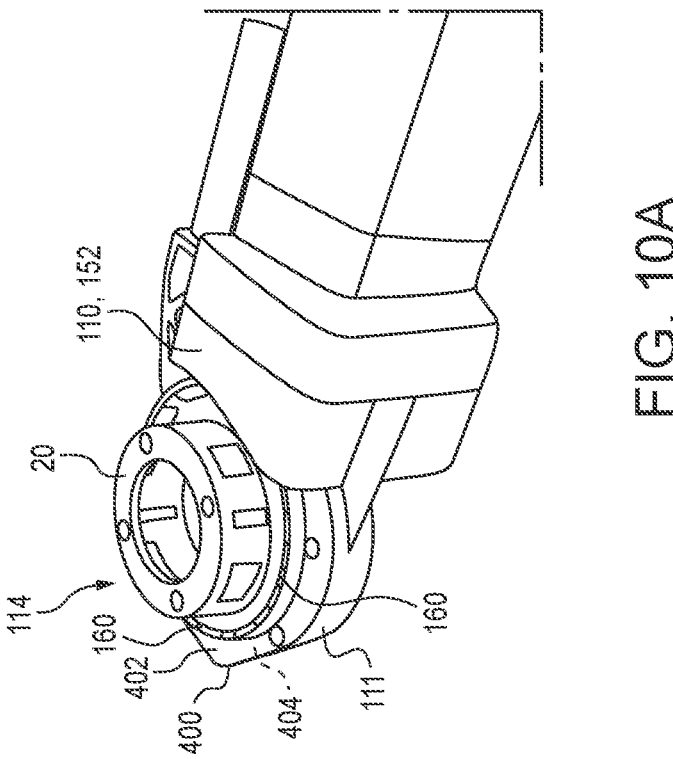

In another embodiment, the present subject matter provides a ring or partial ring of lights mounted coaxially with the die head. Here then, a minimum of two lights can be used, with a greater number of lights used in many applications such as four lights. In certain applications, a minimum of eight lights is used. These aspects are shown in FIGS. 10A and 10B. Specifically, FIG. 10A illustrates a power drive tool 110 and its head portion 111 extending from the tool body 152. A die head 20 is engaged in the head portion 111. The power drive tool 110 comprises light(s) 160 positioned about the head portion 111 and specifically about the tool opening or receiving region 114 of the tool 110 and directed to emit light toward the die head 20. The light(s) 160 can be arranged in a ring, circle, or arcuate manner. FIG. 10B further illustrates the die head 20 and light(s) 160 disposed in the head portion 111.

A plurality of lights arranged in a ring about a tool opening or receiving region 114 of the tool 110 provides improved illumination from all user angles and allows greater visibility to the pipe as the pipe moves axially into the dies and die head.

It is to be understood that this embodiment features a complete ring of lights as shown in FIGS. 10A and 10B. However, one or more partial rings can be used and placed at one or more optimum locations for user visibility. Restated, having the light ring extend below the die head may not be necessary.

Figure 14:
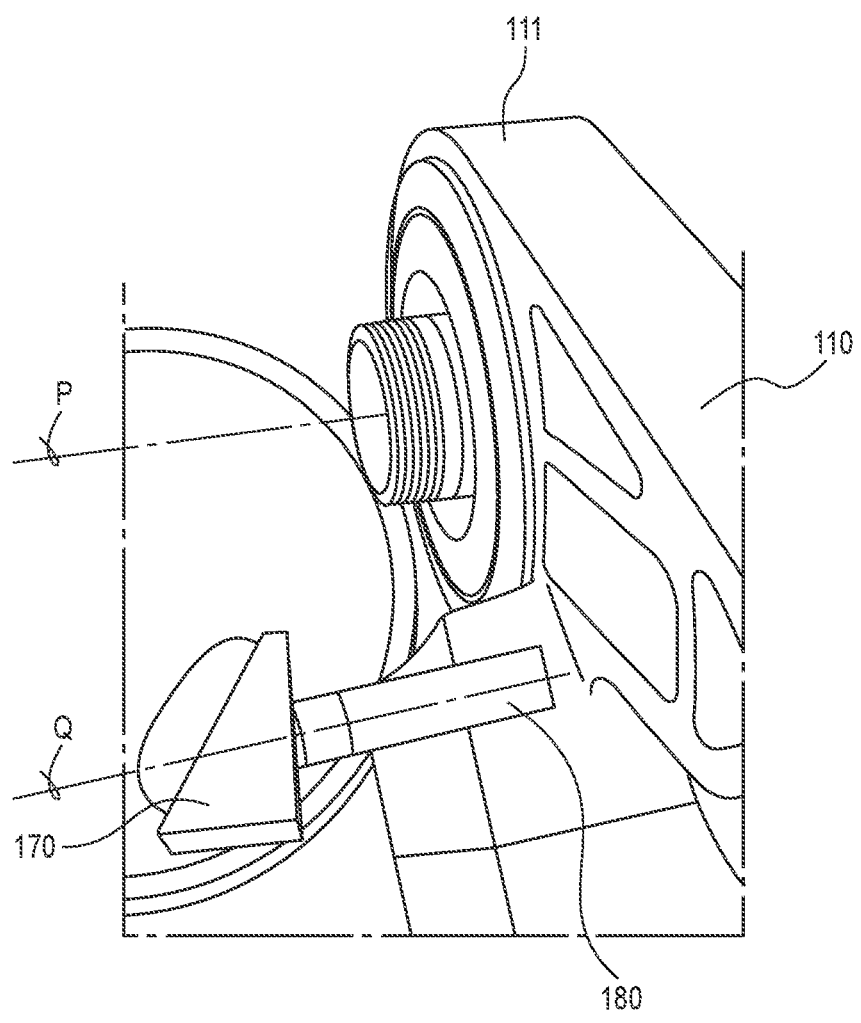
FIG. 14 is a schematic view of another embodiment of a power drive tool with at least one light in accordance with the present subject matter.

Other methods and assemblies for illuminating the pipe workpiece are also included in the present subject matter. In one embodiment, a light or lights are mounted on a component extending from the tool parallel to the pipe axis or at an angle less than 90° to the pipe axis. In some embodiments, this component is hinged and can be rotated into a stored position against the tool body when not needed, then hinged outward, as shown in FIG. 14, to illuminate the pipe. In other embodiments, this component is rigidly mounted into the position shown in FIG. 14. Specifically, FIG. 14 illustrates a lighting component 170 is supported by a light stalk 180. The light stalk 180 is affixed or otherwise secured to a power drive tool 110. As noted, the light stalk 180 can be rigidly affixed to the tool 110. Or, in other versions the light stalk 180 can be selectively positionable relative to the tool 110. In the assembly illustrated in FIG. 14, the light stalk 180 having a longitudinal axis Q extends parallel or substantially so, to axis P of a pipe or workpiece engaged in a tool head portion 111 of the tool 110.

Figure 15:
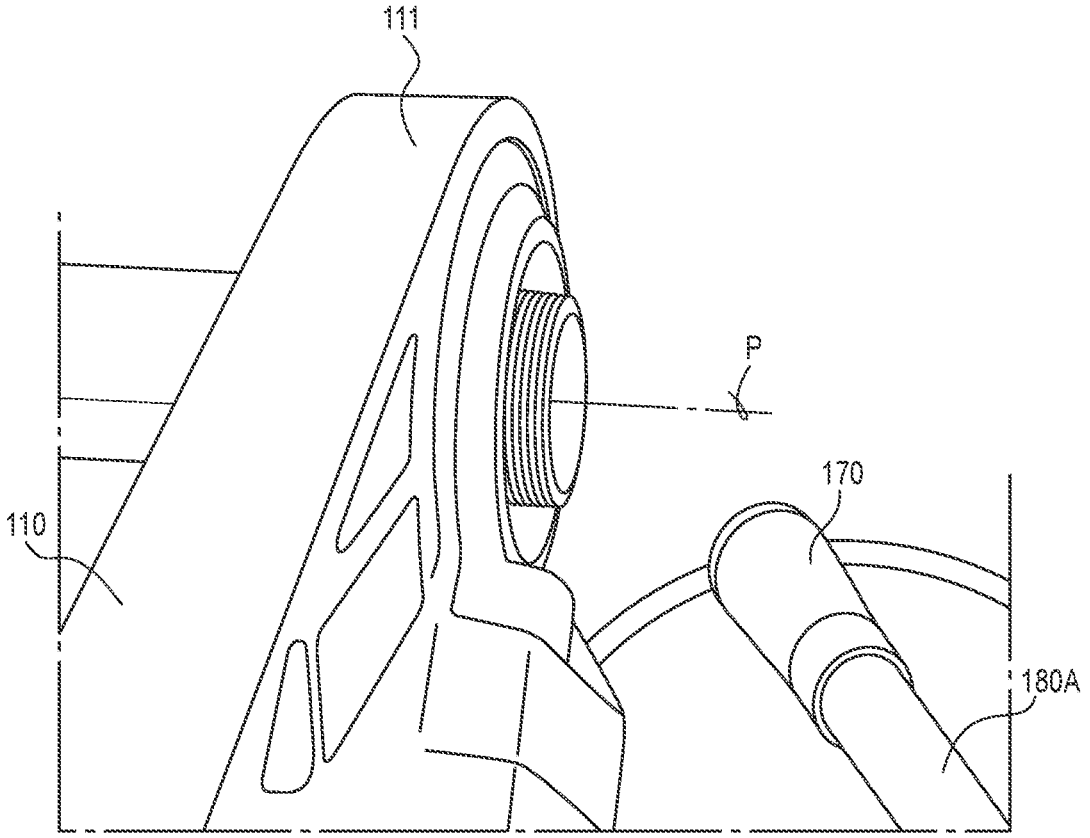
FIG. 15 is a schematic view of another embodiment of a power drive tool with at least one light in accordance with the present subject matter.

Another alternative embodiment for lighting the pipe includes a flexible member that can be repositioned by the user to optimally illuminate the pipe during use. This is shown in FIG. 15. Specifically, FIG. 15 illustrates the lighting component 170 supported by a flexible stalk 180A. In this alternative embodiment, the lighting component 170 can be oriented at nearly any angle relative to the axis P of a pipe or workpiece, and/or the tool head 111.

In this embodiment, the user can modify or selectively position the flexible member in order to illuminate any preferred part of the workpiece. The member is rigid enough to maintain position when released. Since the member is flexible, the member can be moved into a storage location when not needed and is less prone to damage during handling and transport.

In another embodiment, a unique tool mechanical construction or assembly is provided that revises a traditional gear train layout. In existing hand-held power drives, the motor is mounted longitudinal, or in-line, with the tool primary axis. This orientation is lateral, or perpendicular, to the axis of the pipe workpiece. In order for the tool to rotate the die head portion and perform work, the rotational axis must be rotated 90°. In certain existing hand-held power drives, this is accomplished by using a face gear at the last gear stage. This is illustrated in FIG. 11.

Figure 11:
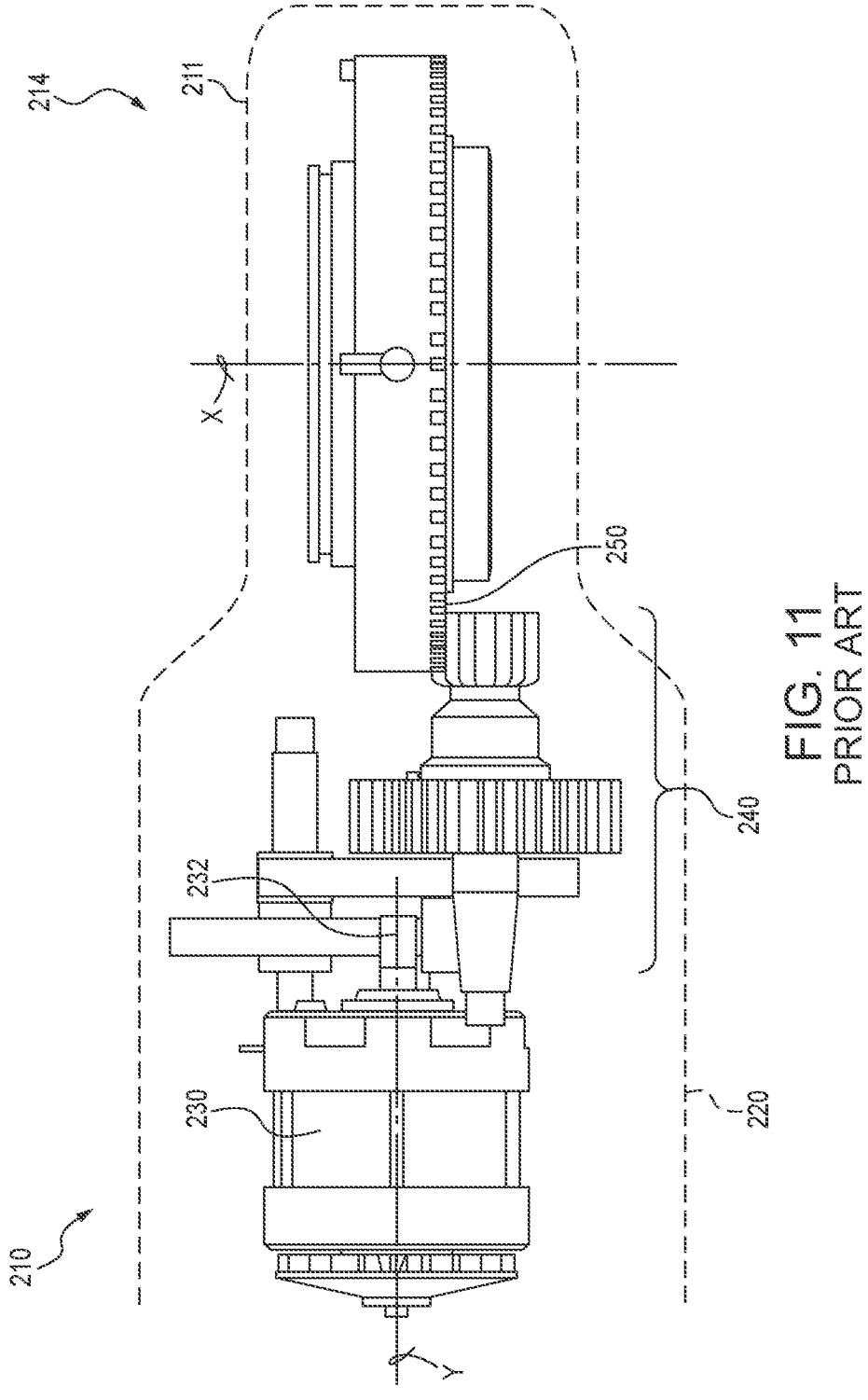
FIG. 11 is a schematic view of a gear assembly in a conventional power drive tool.

Specifically, FIG. 11 schematically illustrates a conventional power drive tool 210. The tool 210 comprises a head portion 211 that provides a receiving region 214 with a rotary engagement assembly at which a member such as a die head can be attached and rotated about axis X for example. The head portion 211 generally extends from a tool body 220 having a longitudinal axis Y. The tool 210 also comprises a motor 230 providing a powered rotary output 232. Typically, the axis of rotation of the powered rotary output 232 is co-extensive with, or parallel with, the longitudinal axis Y. A gear train 240 transfers rotary power from the output 232 to a face gear 250 at the head portion 211. The tool may also include an enclosure or housing. Thus, it will be understood that in this conventional assembly, the axis X is oriented 90° relative to the axis Y.

In other existing hand-held threaders, this 90° rotation of the rotational axis is achieved by using a bevel gear, a worm gear, or similar assembly.

Figure 12:
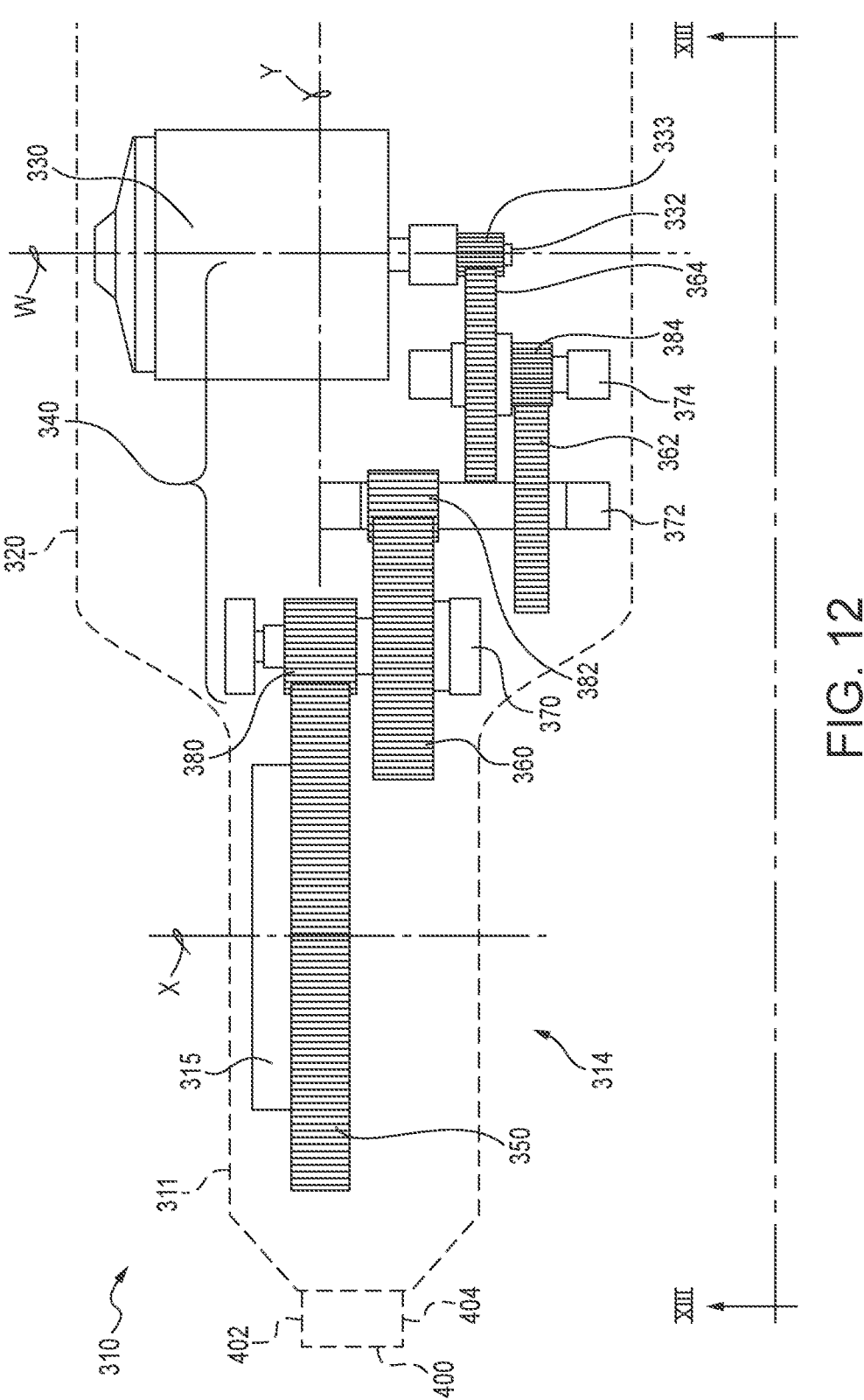
FIG. 12 is a schematic view of an embodiment of a gear assembly in a power drive tool in accordance with the present subject matter.
Figure 13:
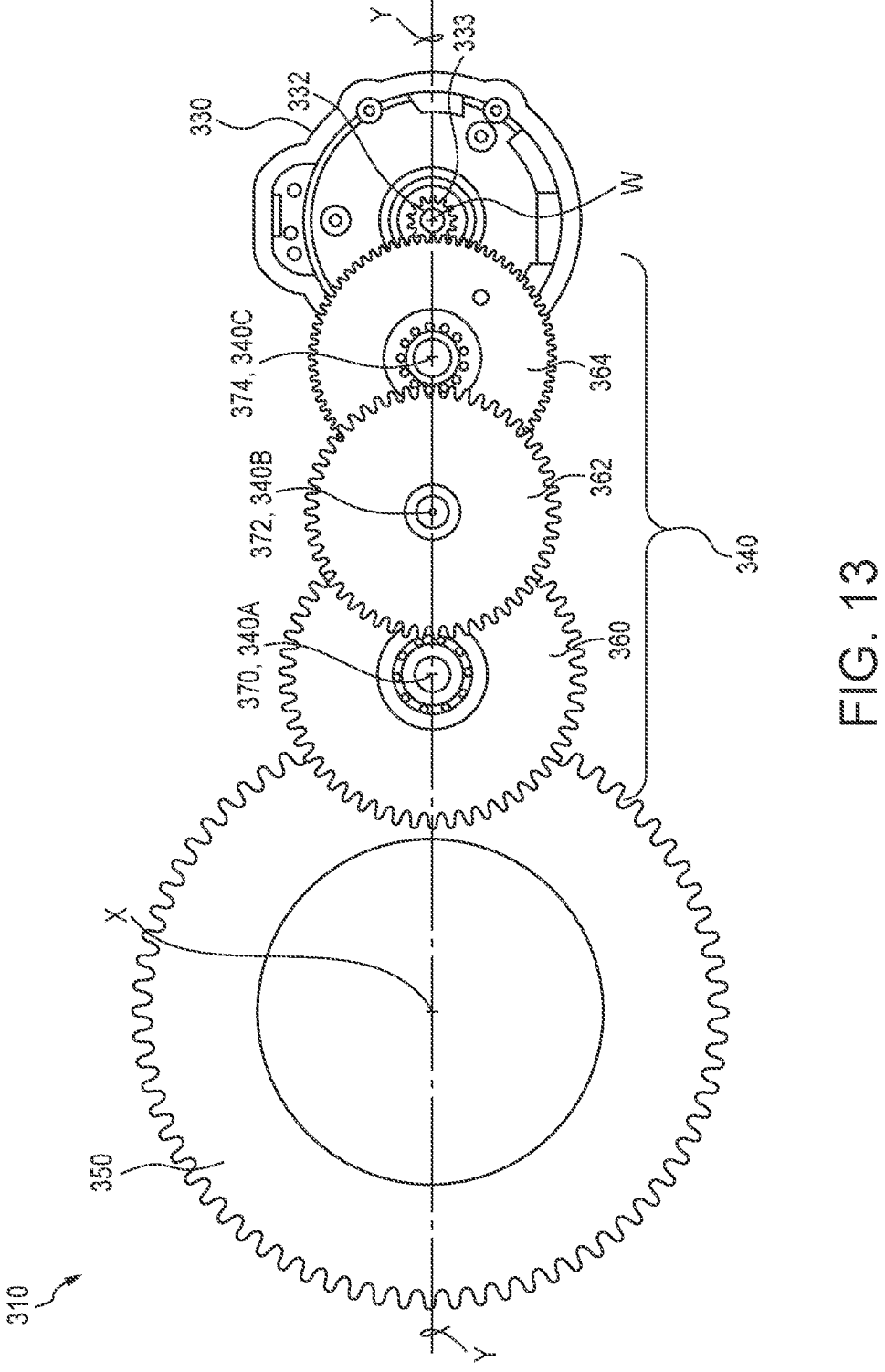
FIG. 13 is a view of a motor, gear train, and a ring gear of FIG. 12, taken from line XIII-XIII in FIG. 12.

In accordance with another aspect of the present subject matter, the motor is oriented lateral to the tool body, and parallel to the pipe workpiece axis. An embodiment is shown in FIGS. 12 and 13. In this manner, simpler gear forms can be used throughout the gear train, for example, spur gears or helical gears, which may result in lower cost. Similarly, this may result in higher overall mechanical efficiency in the gear train, resulting in more work performed by the tool for a given amount of energy.

Specifically, FIG. 12 schematically illustrates an embodiment of a power drive tool 310 in accordance with the present subject matter. The tool 310 generally defines a tool longitudinal axis Y. The tool 310 comprises a head portion 311 extending from a tool body 320. The head portion 311 provides a receiving region 314 with a rotary engagement assembly at which a member such as a die head can be attached and rotated about axis X for example. Typically, the tool head portion 311 also includes a cylindrical wall 315 rotatably supported in the tool opening. The tool 310 also comprises a motor 330 providing a powered rotary output 332. A gear train 340 transfers rotary power from the output 332 to a gear such as a ring gear 350 in the head portion 311. The gear, such as the ring gear 350, is rotatably supported within the head portion 311. The tool 310 may also include an enclosure or housing generally shown in FIG. 12 as the dashed line constituting the tool body 320 and the head portion 311. In the embodiment of FIG. 12, the axis of the motor 330, i.e., the axis of the rotary output 332, shown as axis W, is parallel with the axis of rotation at the die head, shown as axis X. In many versions, the axis of the motor 330 and its output 332, i.e., axis W, is transverse or perpendicular to the longitudinal axis of the tool, i.e., axis Y. As will be understood, rotation of the ring gear 350 results in rotation of the cylindrical wall 315 and components engaged therewith (not shown) such as a die head (not shown).

Referring further to FIG. 12, the gear train 340 generally comprises a rotatable shaft 370 having a gear 360 and another gear 380 mounted thereon. The gear train 340 also comprises another rotatable shaft 372 having a gear 362 and a gear 382 mounted thereon. The gear train 340 also comprises another rotatable shaft 374 having a gear 384 and another gear 364 mounted thereon. Rotary power from the motor 330 is transferred to the shaft 374 by a motor shaft gear 333 mounted on the rotary output or shaft 332 of the motor 330. Power transfer to the shaft 374 from the shaft 332 is accomplished via intermeshing of the gears 333 and 364. Rotary power transfer from the shaft 374 to the shaft 372 is accomplished via intermeshing of the gears 384 and 362. Rotary power transfer from the shaft 372 to the shaft 370 is accomplished via intermeshing of the gears 382 and 360. Rotary power transfer from the shaft 370 to the ring gear 350 is accomplished via intermeshing of the gears 380 and 350.

FIG. 13 is a schematic view of the motor 330, the gear train 340, and the ring gear 350 of FIG. 12, taken from line XIII-XIII in FIG. 12. FIG. 13 further illustrates a parallel orientation of axis W of the motor 330, and its rotary output 332 with axis X of the ring gear 350. FIG. 13 also illustrates an inline orientation of at least one, more particularly two, and more particularly three shaft and gear assemblies of the gear train 340. This feature is exhibited by at least one, particularly two, and more particularly three of the centers of shaft and gear assemblies denoted as 340A, 340B, and 340C, being located in-line with the axes X and W, and in a particular version; being oriented in-line and coinciding with the longitudinal axis Y of the tool 310.

Figure 16:
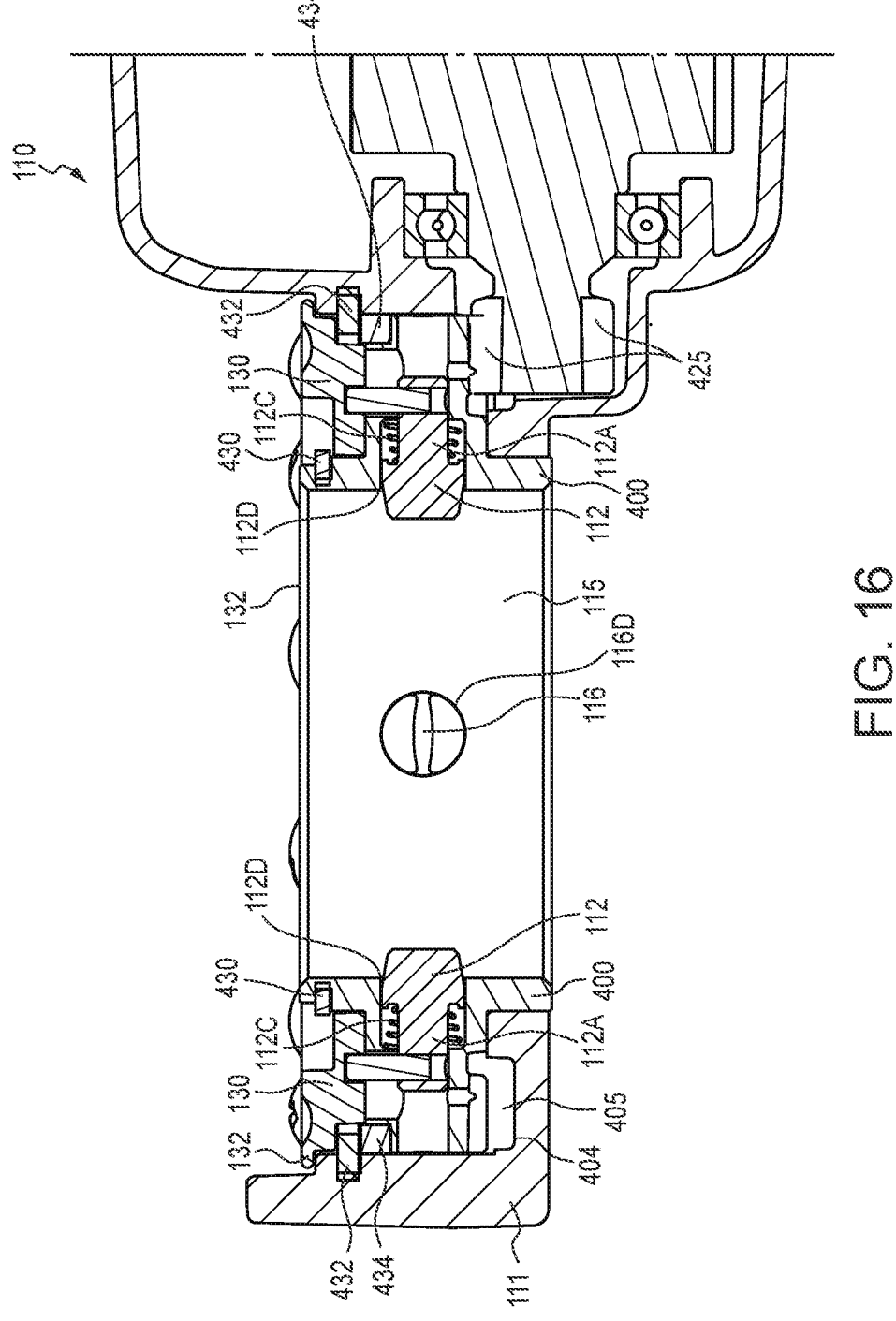
FIG. 16 is a cross section of a head portion of a power drive tool in accordance with the present subject matter.
Figure 17:
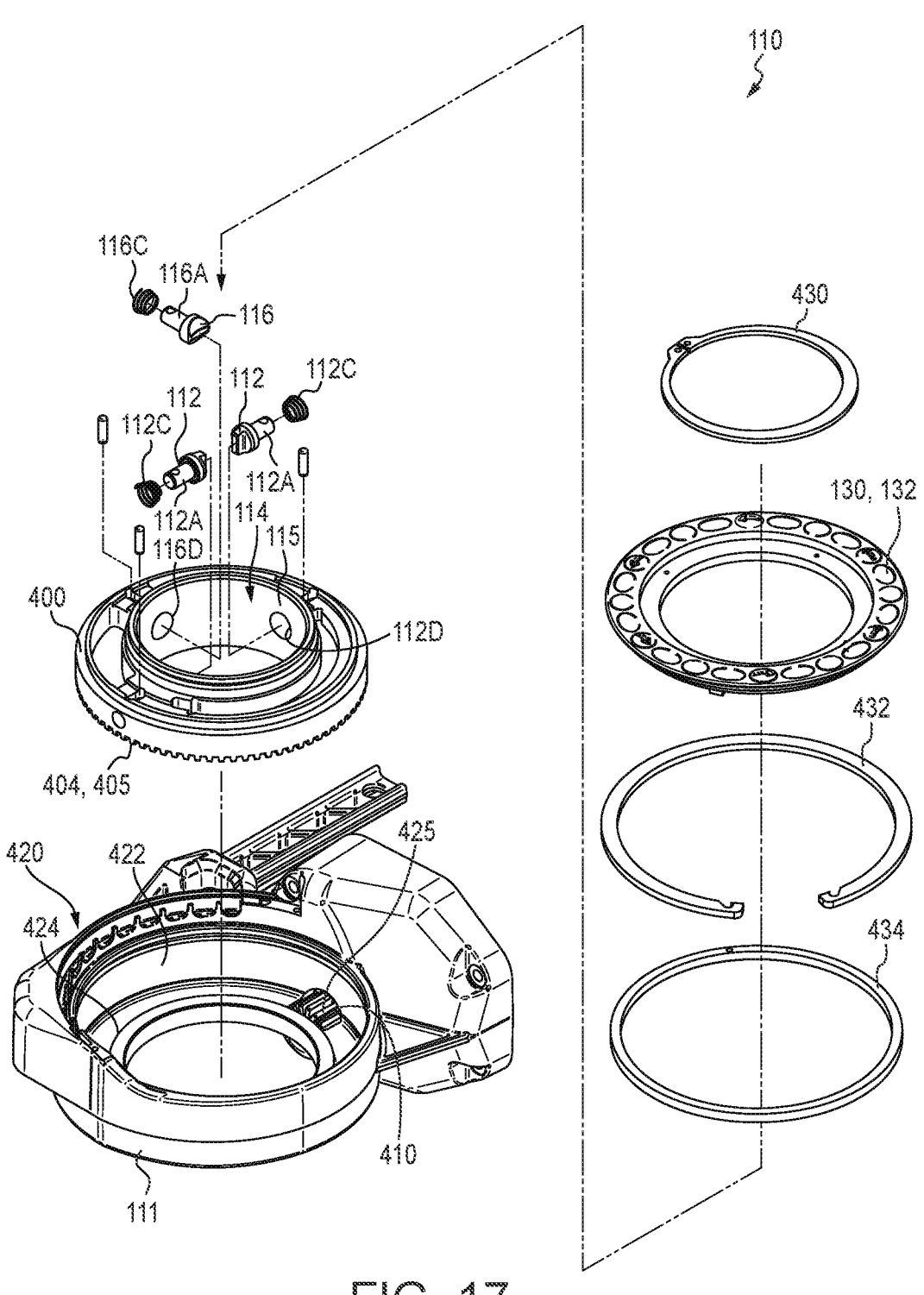
FIG. 17 is an exploded assembly view of a head portion of a power drive tool in accordance with the present subject matter.

FIGS. 16 and 17 further illustrate aspects of the head portion 111 of the power drive tool 110 in accordance with the present subject matter. FIG. 16 is a partial cross section of the head portion 111. FIG. 17 is an exploded assembly view of the head portion 111. The head portion 111 defines a receiving region 420 defined by an interior cylindrical wall 422 and a ledge 424. The receiving region 420 is sized and shaped to receive a rotatable base 400 therein. The receiving region 420 includes an access opening 410 at which is exposed a gear member 425 powered by a drive train (not shown) of the tool 110. As will be understood, upon placement of the base 400 within the receiving region 420, the gear member 425 engages a gear face 405 defined along a face 404 of the base 400. The base 400 defines the previously noted cylindrical wall 115. The base 400 also defines one or more apertures 112D sized and shaped to enable the threading pawls 112 to extend therethrough. The base 400 also defines one or more apertures 116D sized and shaped to enable the release pawl 116 to extend therethrough. Each threading pawl 112 typically includes a biasing member which can be in the form of a spring 112C. Each release pawl 116 typically includes a biasing member which can be in the form of a spring 116C. The springs 112C are sized and shaped to receive the projection 112A of the threading pawl 112. The spring(s) 116C are sized and shaped to receive the projection 116A of the release pawl 116. The drive ring 130 is positioned on the rotatable base 400 such that the base 400 is generally disposed between the drive ring 130 and the tool head portion 111. The face 132 of the drive ring is directed in an opposite direction from the face 404 of the base 400. The drive ring 130 is retained in the head portion 111 by an outer keeper ring 430 and an inner keeper ring 432. A bearing member 434 promotes rotation of the base 400 within the receiving region 420 of the tool head portion 111.

In many applications a user may wish to apply an axial force to a power drive tool and particularly to a tool head portion of such tools. The present subject matter includes two representative embodiments that facilitate application of such forces by a user.

In one embodiment, an area or region within the head profile of the tool is designated for application of force to axially begin the process of cutting a thread. This embodiment eliminates the need for the user to press on the rotating die head and can be implemented in combination with the embodiment involving locking die head retention described herein. This embodiment has the added benefit of not requiring any additional clearance space around the head of the tool. Thus, there is no compromise for the user to have this feature by trading off accessibility of use.

In another embodiment, an outwardly projecting member is provided on the tool head portion for receiving the axial force(s), if applied. Specifically, referring to FIGS. 5A, 6A, 7A, 8, 10A, and 12, an outwardly projecting member such as a shoulder 400 extends from a distalmost region of the power drive tool 110, and particularly the tool head portion 111. The shoulder 400 provides oppositely directed surface regions 402 and 404 which provide regions or location(s) for a user to conveniently apply force to the tool 110. In many versions, the shoulder 400 is integrally formed with, or permanently affixed to, the tool head portion 111.

The benefits to the die head retention lock and unlock system include the following.

The die head retention lock and unlock system, i.e., the active engagement and disengagement system, prevents unwanted, nuisance axial separation of die head from a power drive tool.

The die head retention lock and unlock system allows a user to start thread-cutting via axial force applied to a power drive tool rather than a rotating die head.

The die head retention lock and unlock system provides or enables easier separation of the die head from a power drive tool when removal of the die head is desired. This is because threading pawls do not inhibit removal of the die head.

The die head retention lock and unlock system provides or enables easier, one-handed insertion of the die head into a power drive tool as the system is held in the "open" position.

The die head retention lock and unlock system provides or enables automatic locking of a die head when installed. Subsequently, this reduces installation time and prevents cases of forgotten locking.

The area on a power drive tool to push to start a thread reduces the clearance required around the tool compared to other variations that are characterized by a protrusion beyond the tool head. This allows use of the tool in tighter areas.

A light on a power drive tool to illuminate the die head during use provides the benefits of more consistent lighting when workplace lighting may be minimal, and better visibility for the user to identify when the thread is complete.

The motor position/orientation reduces overall tool length, higher operating efficiency, and may result in lower manufacturing cost.

Variations of the die head lock and release to accommodate 11-R die heads are contemplated. But the same premise exists: a release pawl would detent the drive ring in the "open" or "unlock" position, then the release pawl would be moved during insertion of the die head, causing the system threading pawls to again engage the die head.

In one aspect, the present subject matter provides a power drive tool comprising a tool body and a tool head portion extending from the tool body. The tool head portion defines an axially accessible tool opening. The tool head portion includes a cylindrical wall concentrically and rotatably supported in the tool opening. The power drive tool also comprises at least one threading pawl radially positionable to extend into the tool opening. The power drive tool additionally comprises at least one release pawl radially positionable to extend into the tool opening. And, the power drive tool also comprises a drive ring rotatably mounted on the tool head portion. The drive ring is engaged with the at least one threading pawl and the at least one release pawl and is rotatably positionable between (i) a first position in which the at least one threading pawl extends into the tool opening, and (ii) a second position in which the at least one threading pawl is retracted from extending into the tool opening and the at least one release pawl extends into the tool opening.

In another aspect, the present subject matter provides a power drive tool comprising a tool body and a tool head portion extending from the tool body. The tool head portion defines an axially accessible tool opening. The tool head portion includes a cylindrical wall concentrically oriented and rotatably supported in the tool opening. The tool also comprises at least one light directed to emit light toward the tool opening.

Many other benefits will no doubt become apparent from future application and development of this technology.

All patents, applications, standards, and articles noted herein are hereby incorporated by reference in their entirety.

The present subject matter includes all operable combinations of features and aspects described herein. Thus, for example if one feature is described in association with an embodiment and another feature is described in association with another embodiment, it will be understood that the present subject matter includes embodiments having a combination of these features.

As described hereinabove, the present subject matter solves many problems associated with previous strategies, systems and/or devices. However, it will be appreciated that various changes in the details, materials and arrangements of components, which have been herein described and illustrated in order to explain the nature of the present subject matter, may be made by those skilled in the art without departing from the principle and scope of the claimed subject matter, as expressed in the appended claims.

The invention claimed is:

1. A power drive tool comprising:
a tool body enclosing a motor;
a tool head portion extending from the tool body;
at least one light directed to emit light toward the tool head portion, wherein the at least one light is directed radially inwardly to emit light inwardly from the tool body, and wherein the at least one light is positioned to illuminate a workpiece from a position on the tool head portion that is on the same side of the tool head portion as a user viewing position during operation of the power drive tool; and
a die head including radial openings;
wherein the tool head portion accepts the die head in an axially accessible tool opening defined by the tool head portion.

2. The power drive tool of claim 1 wherein the at least one light is provided on the tool head portion.

3. The power drive tool of claim 1 wherein the tool head portion defines a tool opening and the at least one light is positioned at least partially around the tool opening defined in the tool head portion.

4. The power drive tool of claim 1 wherein the at least one light is provided on the tool body.

5. The power drive tool of claim 1 wherein the tool head portion defines a tool opening and a central axis extending through the opening, the at least one light directed to emit light towards the central axis.

6. The power drive tool of claim 5 wherein the at least one light includes a plurality of lights arranged in an accurate manner and directed to emit light towards the central axis.

7. The power drive tool of claim 1 wherein the at least one light is a plurality of lights arranged in an arcuate manner.

8. The power drive tool of claim 1,
wherein the at least one light is configured to operate in synchronization with movement of the tool head portion during workpiece processing operations to provide continuous illumination of a workpiece.

9. The power drive tool of claim 1, wherein the at least one light comprises a plurality of lights arranged in a circular pattern about a central axis of the tool head portion.

10. A power drive tool comprising:
a tool body enclosing a motor;
a tool head portion extending from the tool body, the tool head portion defining an axially accessible tool opening, the tool head portion including a cylindrical wall concentrically and rotatably supported in the tool opening;
at least one light directed to emit light toward the tool opening defined in the tool head portion, wherein the at least one light comprises at least three lights arranged in an arcuate manner around the tool opening; and
a die head including radial openings, wherein the tool head portion accepts the die head in the axially accessible tool opening.

11. The power drive tool of claim 10 wherein the at least one light is provided on the tool head portion.

12. The power drive tool of claim 11 wherein the at least one light is positioned at least partially around the tool opening.

13. The power drive tool of claim 10 wherein the at least one light is provided on the tool body.

14. The power drive tool of claim 10 wherein the axially accessible tool opening defines a central axis extending through the tool opening, the at least one light directed to emit light towards the central axis, and the at least one light is a plurality of lights mounted symmetrically around the central axis.

15. The power drive tool of claim 14 wherein the at least one light includes a plurality of lights directed to emit light towards the central axis.

16. The power drive tool of claim 10, wherein the at least three lights are positioned to provide direct illumination of a workpiece area during tool operation.

\* \* \* \* \*